March 17, 1931. H. S. POWELL 1,796,345
WELDING MACHINE
Filed Jan. 15, 1929 2 Sheets-Sheet 1
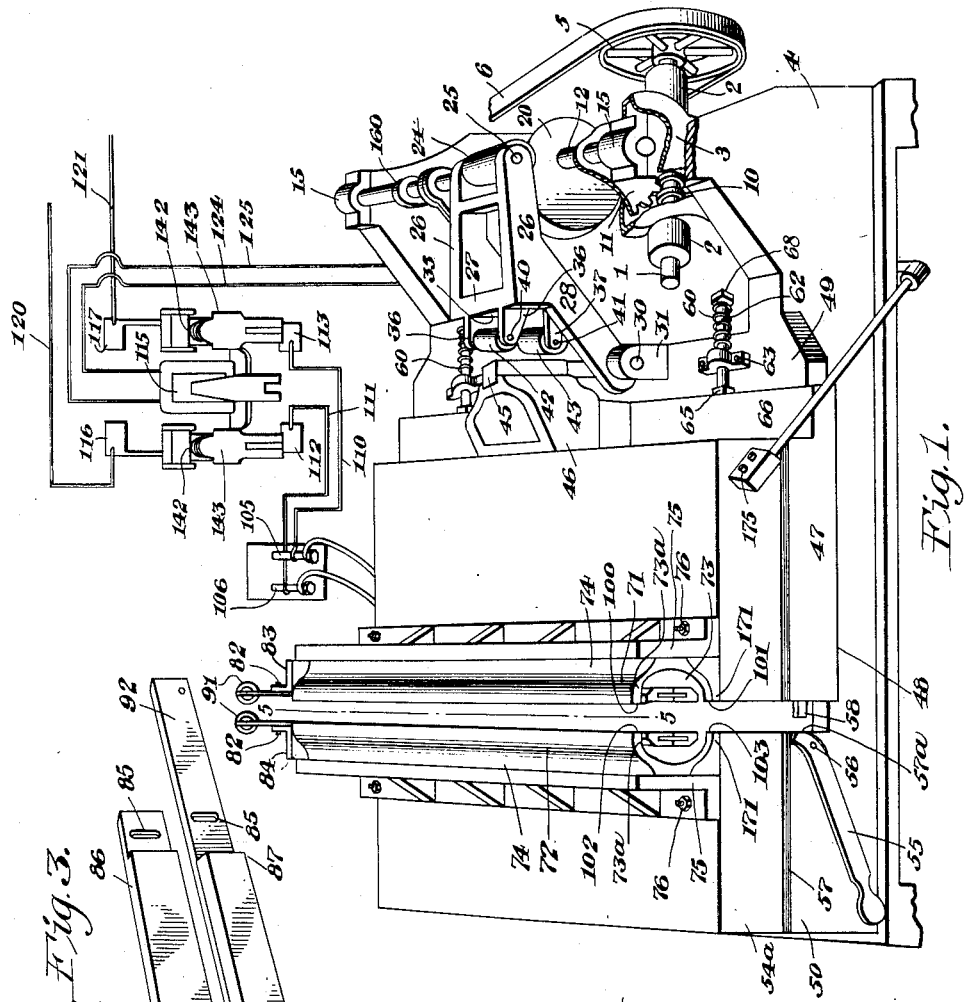
Fig.1.
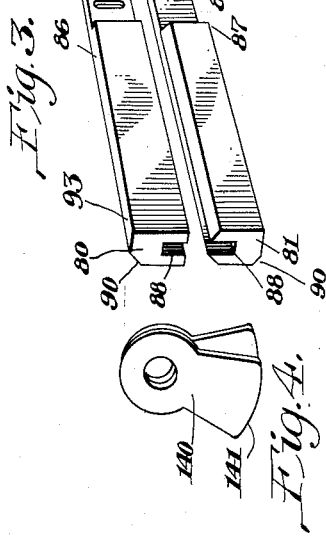
Fig.3.
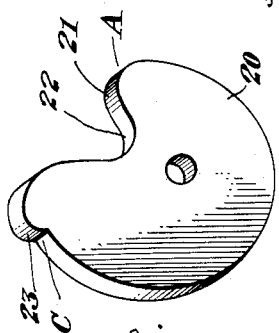
Fig.4.
Fig.2.
Inventor:
Herbert S. Powell
By Thomas L. Wilder
Attorney March 17, 1931.  H. S. POWELL  1,796,345
WELDING MACHINE
Filed Jan. 15, 1929  2 Sheets-Sheet 2
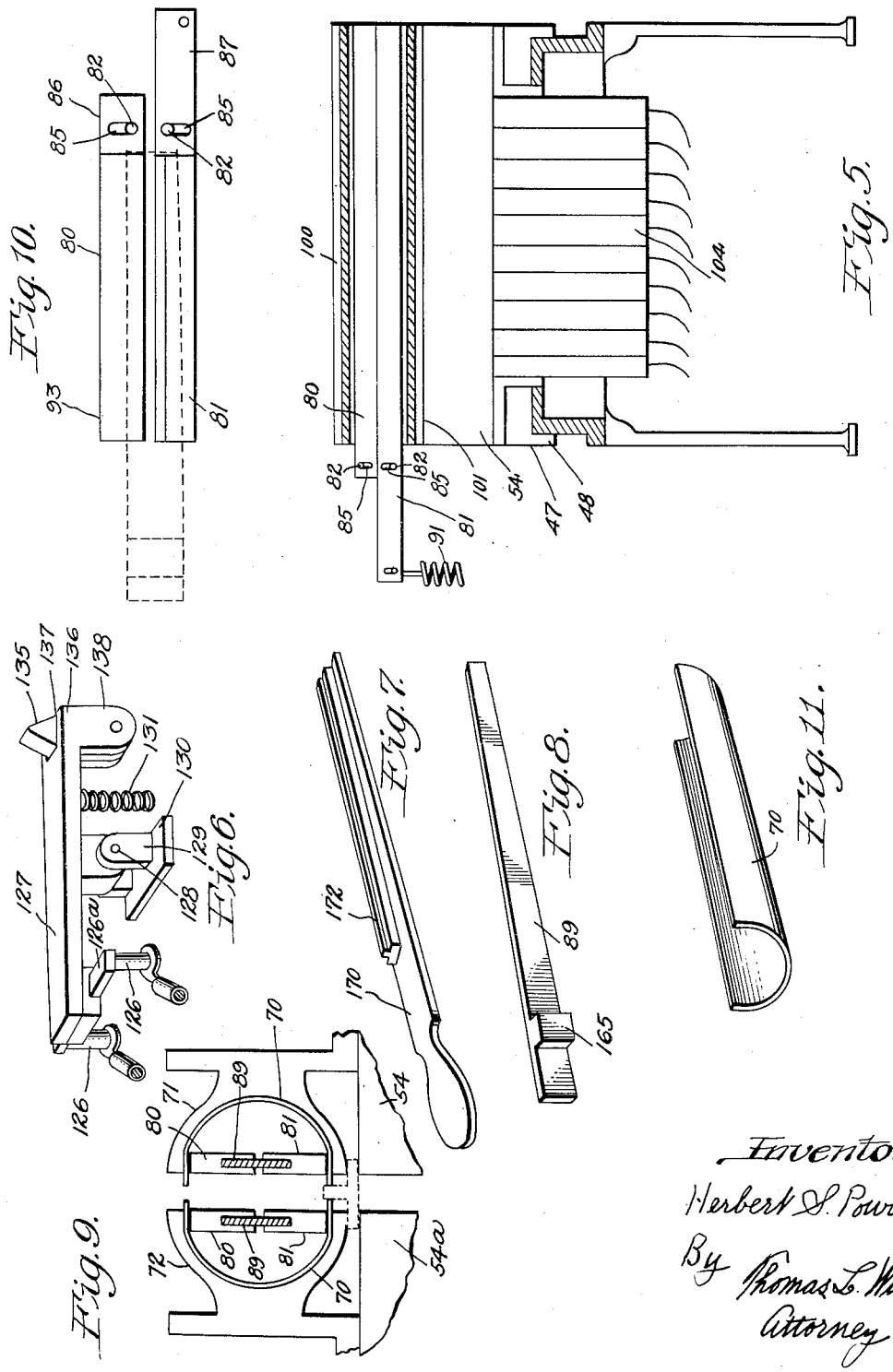

Patented Mar. 17, 1931

1,796,345

UNITED STATES PATENT OFFICE

HERBERT S. POWELL, OF UTICA, NEW YORK

WELDING MACHINE

Application filed January 15, 1929. Serial No. 332,725.

My invention relates to a welding machine, and I declare the following to be a full, clear, concise and exact description thereof sufficient to enable anyone skilled in the art to which it appertains to make and use the same, reference being had to the accompanying drawings in which like reference characters refer to like parts throughout the specifications.

The object of the invention is to provide a machine adapted to weld together the parts of a muffler. The parts comprising such a muffler are made from sheet metal that has previously been bent into circular pieces when fitted together and welded form a hollow cylinder or tube that is used to make a muffler for silencing the sound incident to the exhaust gases coming from an internal combustion engine. To this end the machine is equipped with means for holding the round pieces in fixed position for welding the contiguous edges together and also with means to weld said edges thus held.

The object will appear by reference to the drawings, in which:

Fig. 1 is a perspective view of the device.

Fig. 2 is a detail view showing the perspective of a cam employed.

Fig. 3 is a detail enlarged view showing a perspective of certain holding bars employed.

Fig. 4 is a detail enlarged view showing a perspective of a break arm employed.

Fig. 5 is a vertical section taken on the line 5, 5 of Fig. 1.

Fig. 6 is a detail enlarged view showing a perspective of a rock switch employed.

Fig. 7 is a detail view showing a perspective of a member employed.

Fig. 8 is a detail view showing the perspective of the separating member employed.

Fig. 9 is a detail enlarged view showing an elevation of the holding members, parts being in section and other parts broken away.

Fig. 10 is a detail view showing a side elevation of the holders.

Fig. 11 is a perspective of a piece of sheet metal for forming a muffler.

Referring more particularly to the drawings, the device embodies a master shaft 1 carried in bearings 2, 2 made integral with box casing 3. Box casing 3 is formed integral with main frame 4. Shaft 1 has mounted at one end to turn therewith a pulley wheel 5, which is connected by a belt 6 to an electric motor, not shown, or other well known source of power. A worm 10 is formed on the middle part of shaft 1 and is in mesh with a worm gear 11 mounted to turn with auxiliary or secondary shaft 12. Shaft 12 is carried in bearings 15, 15 made in frame 4.

A cam or eccentric 20 is mounted to turn with shaft 12 and has an irregular peripheral surface 21 made so by a depression at 22 and by an abrupt shoulder at 23 for a purpose hereinafter mentioned. A roller 24 is in contact with the peripheral surface 21. Roller 24 is mounted to revolve on shaft 25 carried in bearings formed in arms 26, 26 of rock yoke 27. There are also two other arms 28, 28 formed as part of yoke 27 and extending in the opposite direction from arms 26, 26 although at an angle. Bearing apertures are formed in the free end of each of said arms 28, 28 for the projection of a shaft 30 which forms a fulcrum upon which yoke 27 turns or rocks. Shaft 30 has bearings in upstanding brackets or bearings 31, 31 made integral with the main frame 4.

Yoke 27 has a vertical wall 35 disposed between arms 28, 28. Two sets of laterally extending brackets 36, 36, and 37, 37 are made integral with said wall 35. Shafts 40 and 41 are carried in said sets of brackets 36, 36 and 37, 37 respectively. Rollers 42 and 43 are mounted to turn on said respective shafts 40 and 41. Roller 43 is in contact with rail or member 45 securedly fixed to the grooved end of bracket 46, which is in turn bolted to movable member 47. Member 47 has depending guide flanges 48, 48 adapted to govern the direction of movement of member 47 along the flat edge surface 49 of frame 4. Member 47 is adapted to cooperate with stationary member 50 which is part of frame 4 for a purpose to be hereinafter described. Metallic plates 54, 54a are mounted on members 47 and 50 respectively although insulated therefrom by rubber matts 57. Member 47 is forced away from member 50 by means of lever handle 55 which is fulcrumed at 56 to frame 4. For this purpose end 57a of lever 55 is adapted to make contact with projecting lug 58 formed integral with the end surface of member 47. Moreover coiled springs 60, 60 which are mounted on adjustable bolts 62, 62 screw mounted to upstanding brackets 63, 63 aid in withdrawing member 47 from member 50. Brackets 63, 63 are bolted to flat surface 49 of frame 4. Lock nuts 65, 65 are mounted on the ends of bolts 62, 62 that engage threaded apertures in the end surface of movable member 47. Member 47 is reduced at 66 to form a support for bracket 46, heretofore mentioned. Coiled springs 60, 60 press at one end against the heads 68, 68 of bolts 62, 62 and at the other against the lateral surfaces of upstanding brackets 63, 63, whereby to tend to draw movable member 47 towards said brackets 63, 63 as mentioned above. This tendency will hold rail 45 connected to member 47 through bracket 46 in constant contact with roller 43, and, thereby cause said member 47 to move longitudinally corresponding to the rocking motion of yoke 27.

The means for holding the circular pieces 70, 70 that are welded together to comprise a muffler embodies the jaws or curved shaped members 71 and 72. Each of the members 71 and 72 has an annular trough or recess 73 adapted to conform to the curvature of the pieces 70 to be welded together. A departure is made in the curvature at 73a, to effect horizontal surfaces, whereby the contiguous edges of pieces 70, 70 will move toward each other in the same plane. Part 74 of each of the jaws 71, 72 containing the recess 73 is made integral with a right angular bracket part 75 that is bolted at 76, 76 to plate 54 on member 47. Pieces 70, 70 are slipped endwise into recesses 73.

The means for holding said pieces 70, 70 in position in recesses 73, 73 and in position to be welded contemplates two sets of bars 80, 81 which are fulcrumed to bolts 82, 82 mounted to bracket 83, 84 that are bolted in each instance to one end of members 71, 72. An elongated slot 85 is made in each of the bars 80, 81 for the projection of bolt 82, whereby to allow for a limited amount of play between the ends 86, 87 of said bars 80, 81. Moreover each of the bars 80, 81 is equipped with a rabbet or groove 88 for the disposition of a wedging member 89. Member 89 is tapered on its under surface or on both as desirable so that when thrust longitudinally through grooves 88, 88 it will cause said bars 80, 81 to separate and bind against the pieces of metal 70, 70 to be welded. The elongated slots 85 in bars 80, 81 will permit said bars to move in parallel planes to each other, whereby to bind said pieces 70 throughout their entire length. Corners 90, 90 of bars 80, 81 are beveled or curved to conform to the curvature of the surfaces of recesses 73, 73 and, thereby, prevent any interference with metal pieces 70, 70. The free end of each of lower bars 81 is held up off from the surface of members 71 and 72, whereby to permit metal pieces 70, 70 to be inserted longitudinally into recesses 73, 73, by a coiled spring 91 attached at one end to the extension 92 of bar 81 and at the other end to the lower part of frame 4 or floor, not shown. The free end 93, 93 of bars 80 will drop down and away from the surfaces of members 71 and 72 by gravity.

The electric arc for welding the contiguous edges of metal pieces 70, 70 is passed between edges 100, 101 and 102, 103 of members 71 and 72 respectively. The circuit for electrifying said edges 100, 101 and 102, 103 embodies plates 54, 54a which are in electrical contact with members 71 and 72. Transformers 104, 104 of any well known construction are attached to the underside of plates 54, 54a respectively. The several wires leading from the transformers 104, 104 are brought together in positive and negative groups and wound about bolts 105, 106 which are connected by single double duty wires 110 and 111 of the main circuit to the terminals 112 and 113 of an automatic switch 114 of well known construction which is controlled by a magnet 115. Terminals 116, 117 of switch 114 are connected by wires 120 and 121 of the main circuit to some well known source of electric power.

The means for energizing magnet 115, whereby to close switch 114 to effect the electric weld at the proper instant embodies an electric circuit comprising wires 124 and 125, which connect said magnet 115 with the electric contact members 126, 126 on which cross member 126a fixed to rock switch 127 will come to rest to close the electric circuit. Switch 127 is mounted to rock on shaft 128 carried in bearings formed in upstanding arms 129, 129 of bracket 130 which is fastened to the frame 4. A coiled spring 131 disposed between the upper surface of frame 4 and the under surface of switch 127 holds said switch 127 yieldingly in horizontal position upon contact members 126. A wedge shaped contacting member 135 is mounted to one end 136 of switch 127, and held somewhat firmly in position although it will yield in one direction in the event the rotation of shaft 12 is reversed. To this purpose an open recess 137 is made in said end 136 and depending arms 138, 138 formed integral with switch 127 and adjacent the sides of recess 137. A duplex adjustable arm 140 is mounted to turn with shaft 12. Its lower free end 141 is adapted to make contact with the upper part of wedge shaped member 135, whereby to rock switch 127 to break the contact at 126 and thereby demagnetize magnet 115. Immediately magnet 115 is demagnetized, springs 142, 142 of said automatic switch 114 will actuate the knife switches 143 to open position to break the electric welding circuit. It will be noted that the welding circuit is timed to occur simultaneously with the movement of movable member 47 as it approaches stationary member 50, or from point A on cam 20 to shoulder 23. During this interval movable member 47 is gradually pushed towards stationary member 50, whereby jaw 71 approaches jaw 72, because of the contour of cam 20, in order to compensate for the burning away of the contacting edges of metal pieces 70, 70 under the heat of the welding current. At point C of cam 20, roller 24 will ride up shoulder 23. This in turn will impart a quick impulse to the rocking of yoke 27, whereby to cause roller 42 to strike against rail 45 and, thereby, push movable member 47 and its jaw 71 further forward to effect a hammer stroke against the edges of metal pieces 70, 70 being welded. Immediately roller 42 has passed over shoulder 23 and dropped down into cavity 22 of cam 20, movable member 47 will be free to be pushed back by means of lever handle 55 aided by coiled springs 62, 62. Simultaneously with the rising of roller 24 upon shoulder 23, the lever end 141 of adjustable arm 140 will strike against wedge shaped member 135 on switch 127 and, thereby, rock said switch 127 on its fulcrum, shaft 128, to break the electric circuit at contact members 126 and hold it broken for a given period according to the extent of the lower surface 141 of adjustable arm 140. This break in the electric circuit will demagnetize magnet 115 of automatic switch 114 and, thereby, permit springs 142, 142 to force knife switches 143 to open position.

While adjustable arm 140 is effecting a break in the welding circuit, arm 160, which is mounted to turn with shaft 12 also, will make contact with another switch similar to switch 127 to effect an actuation of another well known automatic switch similar to switch 114, whereby to shut off the electric motor that turns motor shaft 1, to stop the machine, whereupon lever handle 55 will be manipulated to push back member 47. Members 89 will be partially withdrawn from between bars 80, 81 by aid of lugs 165, one of which lugs 165 is fixed laterally to each of said members 89. Welded pieces 70, 70 will be withdrawn and new pieces substituted. Before substituting the new pieces 70, 70, however, a member 170 will be projected longitudinally through the space at 171 between the contiguous surfaces of jaws 71, 72 and upper surface of plates 54, 54a. Bar 172 fixed to member 170 will determine the correct distance apart between the adjacent edges of metal pieces 70, 70. Said member 170 after performing this function will be withdrawn. Pieces 70, 70 will stay in given position, however, by frictional contact with the surface of jaws 71, 72. The machine can be started again and the aforesaid operations repeated by pushing the electric button 175.

Having thus described my invention what I claim as new and desire to secure by Letters Patent is as follows:

1. In a welding machine, jaws for holding material to be welded, means for moving one of said jaws relative to the other, and expansive bars for clamping said material to be welded within said jaws.

2. In a welding machine, jaws for holding material to be welded, means for moving one of said jaws relative to the other and expansive clamping bars for holding said material within said jaws.

3. In a welding machine, jaws for holding the material to be welded, means for moving said jaws relative to each other, and expansive clamping bars for holding said material within said jaws.

4. In a welding machine, bars for holding material to be welded and a wedging member mounted between said bars whereby to force said bars into contact with said material.

5. In a welding machine, jaws for holding annular pieces of material to be welded, expansive wedging means for clamping said pieces within said jaws, one of said jaws movable relative to the other and cam means for actuating said jaw.

6. In a welding machine, jaws for holding material to be welded, an expansive clamping member for holding said material within said jaws, and cam means for moving one of said jaws relative to the other.

7. In a welding machine, jaws for holding material to be welded, bars for making contact with said material whereby to hold it in said jaws and a wedge shaped member mounted between said bars, whereby the aforesaid bars enter contact with said material.

8. In a welding machine, jaws for holding material to be welded, a rocking member and a cam for actuating said rocking member, whereby to move one of said jaws relative to the other to hold said parts to be welded.

9. In a welding machine, jaws for holding material to be welded, means for moving one of said jaws relative to the other, and clamping means within said jaws for engaging the upper and lower edges of material to be welded.

In testimony whereof, I have affixed my signature.

HERBERT S. POWELL.